United States Patent [19]
Lee et al.

[11] Patent Number: 5,991,254
[45] Date of Patent: Nov. 23, 1999

[54] OPTICAL PICKUP HAVING A MULTI-COATED POLARIZATION HOLOGRAPHIC ELEMENT

[75] Inventors: Chul-woo Lee, Seoul; Keon-ho Cho, Suwon; Chong-sam Chung, Seongnam, all of Rep. of Korea

[73] Assignee: Samsung Electronics Co., Ltd., Suwon, Rep. of Korea

[21] Appl. No.: 08/903,063

[22] Filed: Jul. 30, 1997

[30] Foreign Application Priority Data

Jul. 30, 1996 [KR] Rep. of Korea ............... 96-31539
Jul. 30, 1996 [KR] Rep. of Korea ............... 96-31540

[51] Int. Cl.$^6$ ................................................ G11B 7/00
[52] U.S. Cl. .................... 369/112; 369/103; 369/109; 369/110
[58] Field of Search ................... 369/112, 109, 369/110, 103, 44.12, 44.27, 44.37

[56] References Cited

FOREIGN PATENT DOCUMENTS

0612068 A2 8/1994 European Pat. Off. .

Primary Examiner—Muhammad N. Edun
Attorney, Agent, or Firm—Staas & Halsey

[57] ABSTRACT

An optical pickup adopting a multi-coated polarization holographic optical element (HOE). The optical pickup has a light source, an objective lens for converging light emitted from the light source on a recording medium, a holographic optical element (HOE) arranged along an optical path between the light source and the objective lens, for changing traveling of the incident light, a phase delay plate arranged between the HOE and the recording medium, for changing a polarization direction of the incident light, and a photodetector for receiving the light reflected by the recording medium, wherein the HOE includes a polarization beam splitter for transmitting one polarized light component of the incident light and reflecting the other polarized light component thereof; and a reflection member having a hologram pattern for diffracting the light passed through the polarization beam splitter, for reflecting the incident light, and wherein the HOE is arranged at an angle between the light source and the phase delay plate. Also, when a transmission-type HOE is adopted, the phase delay plate is arranged at an angle along the optical path between the HOE and the objective lens and includes multiple coating layers for transmitting one polarized light component of the light incident from the light source and reflecting the other polarized light component, and a reflection layer formed on one side of the multiple coating layers, for completely reflecting the incident light.

17 Claims, 8 Drawing Sheets

S(P)TYPE HOLOGRAM

OPTICAL PICKUP HAVING A MULTI-COATED POLARIZATION HOLOGRAPHIC ELEMENT

BACKGROUND OF THE INVENTION

The present invention relates to an optical pickup, and more particularly, to an optical pickup adopting a multi-coated polarization holographic optical element (HOE).

Generally, an optical pickup is for recording and/or reproducing information related to pictures, sound and data on an optical recording medium in a noncontact manner.

FIG. 1 is a schematic perspective view of a conventional optical pickup adopting a general HOE. The optical pickup includes a light source 20, an HOE 50 for changing a traveling path of incident light, a phase delay plate 60 for changing a polarization direction of the incident light, an objective lens 70 for converging the light entered from the light source 20 on a recording surface of a recording medium 10, and a photodetector 80 for detecting an information signal and an error signal.

The objective lens 70 is driven by an actuator (not shown) to correct tracking and focusing errors based on the error signal detected from the photodetector 80.

The HOE 50 is arranged at a position along an optical path between the objective lens 70 and the light source 20, and is formed by etching a substrate to form its hologram pattern to provide different diffraction characteristics in accordance with the polarization direction of the incident light. Generally, the phase delay plate 60 includes a λ/4 waveform plate for changing a linearly polarized light incident from the light source 20 into a circularly polarized light and changing the circularly polarized light reflected from the recording medium into the linearly polarized light. A reflecting mirror 40 for changing a traveling path of the light emitted from the light source 20 is arranged at an angle between the light source 20 and the HOE 50 under the consideration of the optical arrangement of the optical pickup. Also, a collimating lens 30 for collimating a divergent light emitted from the light source 20 may be included in the optical path between the light source 20 and the reflecting mirror 40.

As described above, the optical pickup adopting the HOE 50 has a simpler optical structure than an optical pickup adopting a beam splitter.

As shown in FIG. 2, the conventional HOE 50 adopted in the above optical pickup uses a substrate 51 made of LiNb$_3$ having a high refractive index, wherein a plurality of grooves 52 are formed by an etching process. The light incident on the HOE 50 is transmitted in a region having the grooves 52 without a phase delay. Meanwhile, the phase of a P-polarized light component or an S-polarized light component is reversed by 180° in a region without the grooves 52. Accordingly, a polarized light component passed through the HOE 50, such as a light 54 of a P-polarized light component, is transmitted directly, while the other polarized light component such as a light 55 of an S-polarized light component is diffractively transmitted. The HOE 50 can transmit the light directly or diffractively according to the polarized light component of the incident light. However, the material of the substrate used therefor, i.e., LiNb$_3$, is expensive, and thus, manufacturing costs of the conventional optical pickup adopting the HOE are quite high.

SUMMARY OF THE INVENTION

To overcome the above defect, it is an object of the present invention to provide an optical pickup adopting a holographic optical element (HOE) formed by stacking multiple thin layers.

It is another object of the present invention to provide an optical pickup adopting a reflective type HOE formed by stacking multiple thin layers.

To achieve the first object, there is provided an optical pickup having a light source, an objective lens for converging light emitted from the light source on a recording medium, a holographic optical element (HOE) arranged along an optical path between the light source and the objective lens, for changing traveling of the incident light, a phase delay plate arranged between the HOE and the recording medium, for changing a polarization direction of the incident light, and a photodetector for receiving the light reflected by the recording medium, wherein the HOE comprises a polarization beam splitter for transmitting one polarized light component of the incident light and reflecting the other polarized light component thereof; and a reflection member having a hologram pattern for diffracting the light passed through the polarization beam splitter, for reflecting the incident light, and wherein the HOE is arranged at an angle between the light source and the phase delay plate.

To achieve the second object, there is provided an optical pickup having a light source; an objective lens for converging light emitted from the light source on a recording medium; an HOE arranged along an optical path between the light source and the objective lens, for changing traveling of the incident light; a phase delay plate arranged between the HOE and the recording medium, for changing the polarization direction of the incident light; and a photodetector for receiving the light reflected by the recording medium via the HOE, wherein the HOE includes a transparent substrate for transmitting the incident light, multiple thin layers formed by alternately stacking a first thin layer and a second thin layer each having different reflective indices on the transparent substrate, and a reflection layer coated on the transparent substrate and one side of the multiple thin layers for completely reflecting the incident light.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF THE INVENTION

Figure 1:
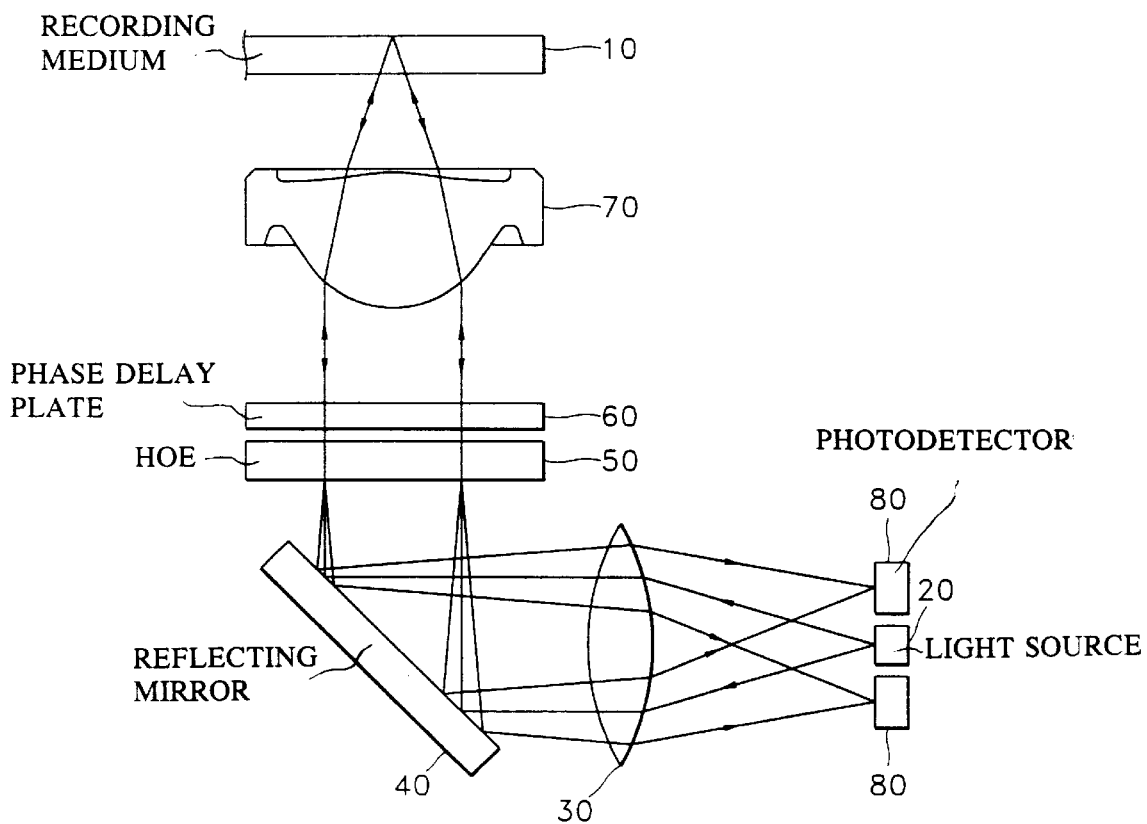
FIG. 1 is a schematic diagram showing the optical arrangement of an optical pickup adopting a conventional HOE.
Figure 2:
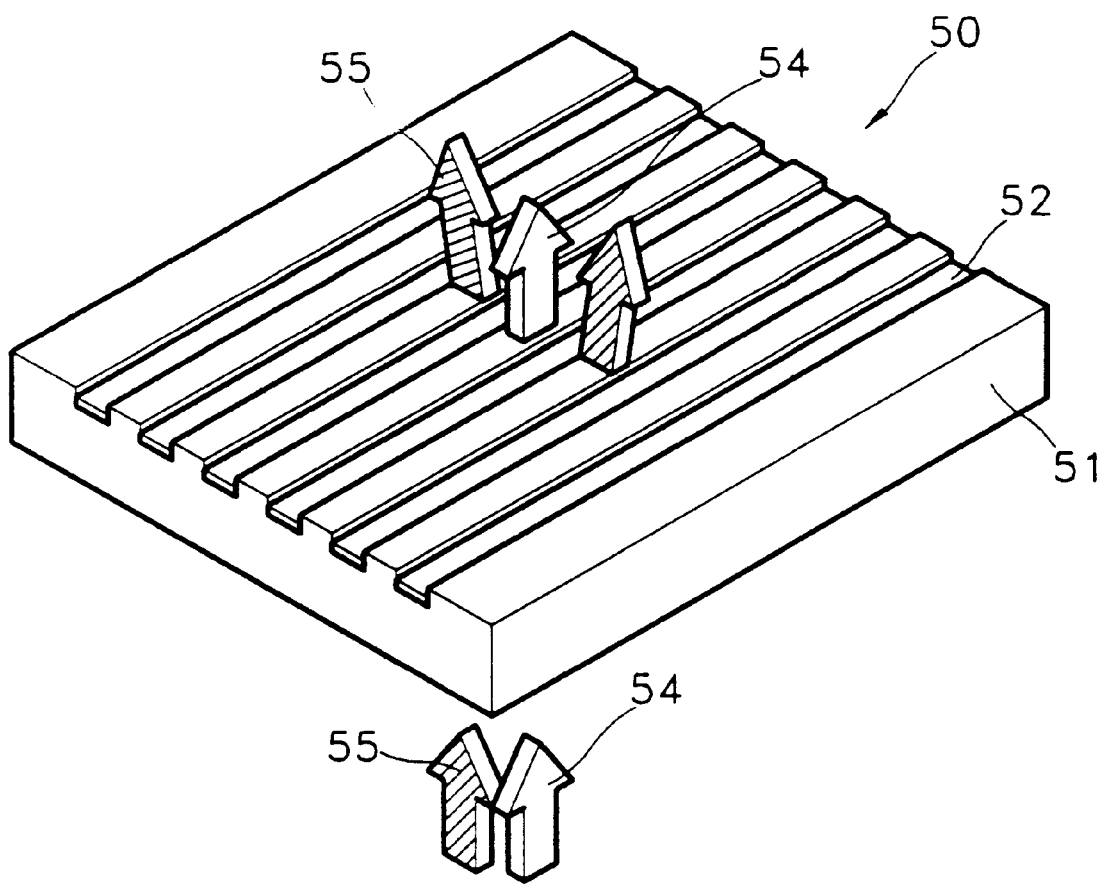
FIG. 2 is a schematic perspective view showing the conventional HOE.
Figure 3:
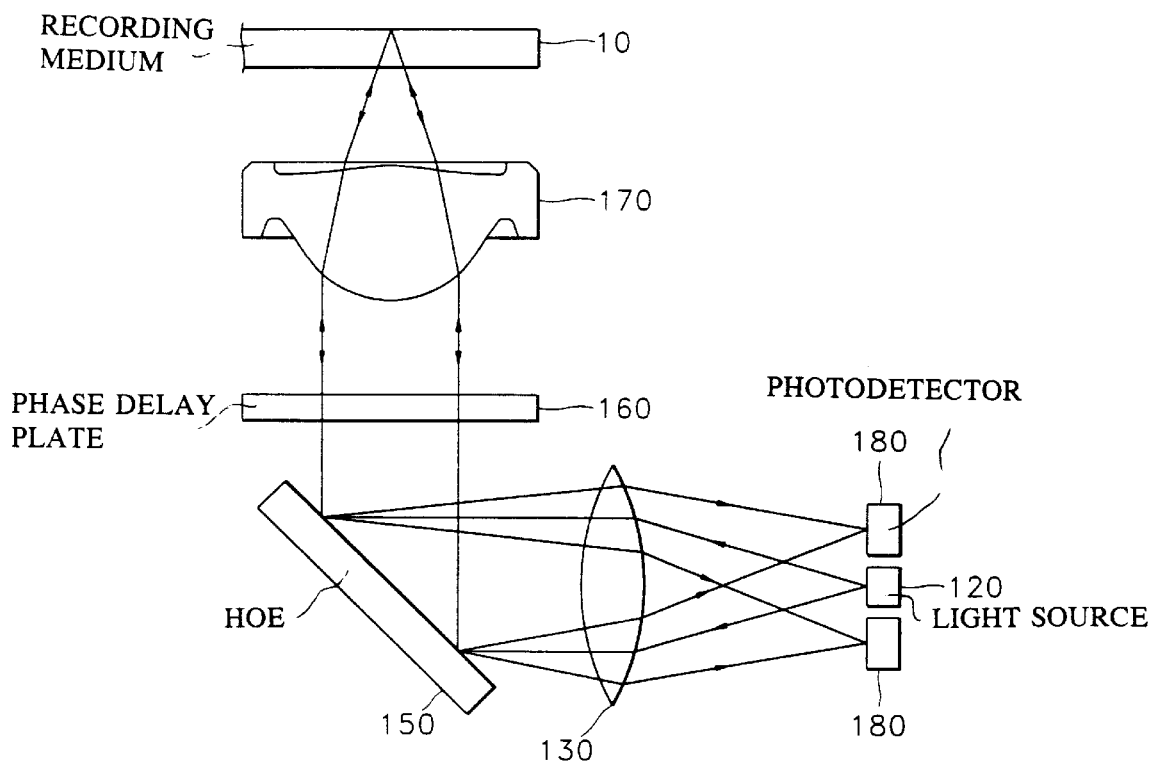
FIG. 3 is a schematic diagram showing the optical arrangement of an optical pickup according to a first embodiment of the present invention.

As shown in FIG. 3, an optical pickup according to a first embodiment of the present invention includes a light source 120, a holographic optical element (HOE) 150, a phase delay plate 160, an objective lens 170 and a photodetector 180. Here, the light source 120, the objective lens 170 and the photodetector 180 are the same as the light source 20, the objective lens 70 and the photodetector 80 described in FIG. 1, respectively, and thus the description thereof will be omitted. Also, preferably, a collimating lens 130 for collimating a divergent light emitted from the light source 120 is further provided along the optical path between the light source 120 and the HOE 150.

The HOE 150 is arranged at an angle along the optical path between the collimating lens 130 and the objective lens 170. The HOE 150 as a reflective type reflects the light from the light source 120 toward a recording medium 10 and the light back from the recording medium 10 toward the photodetector 180 which is near the light source 120.

Figure 4:
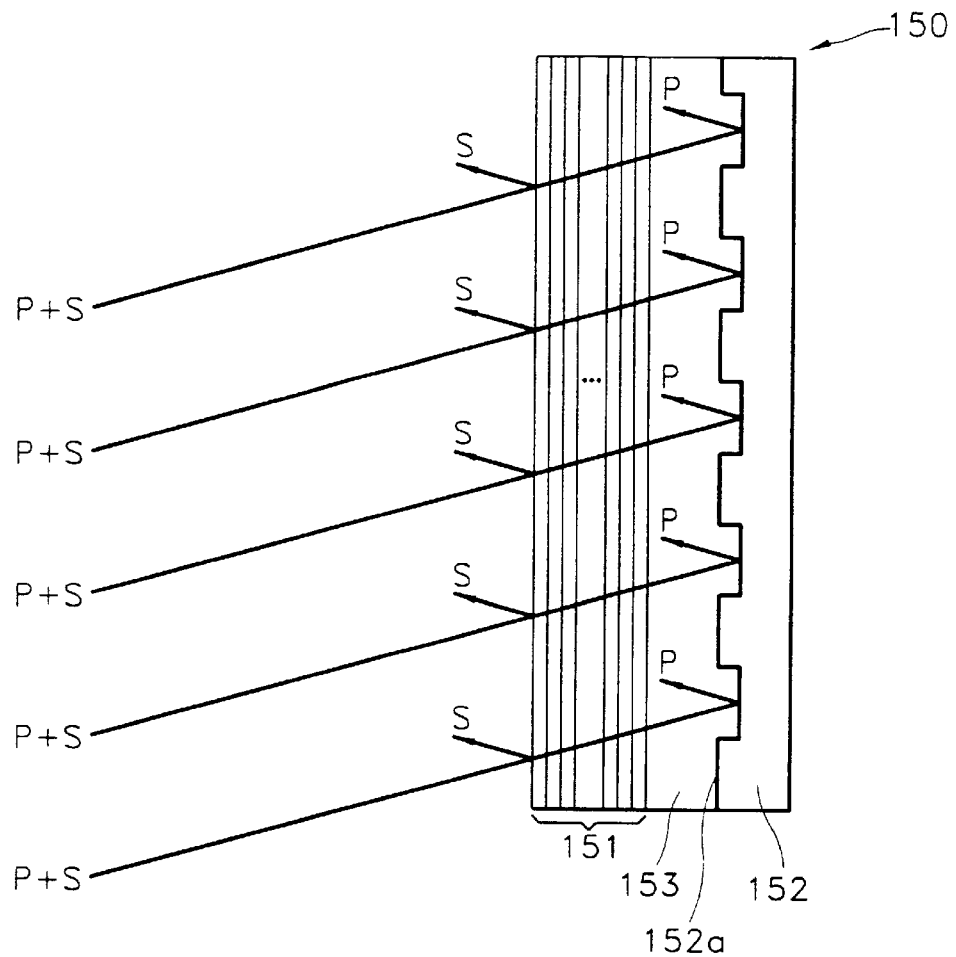
FIG. 4 is a schematic diagram showing an example of the HOE shown in FIG. 3.

According to an example of the HOE 150, the HOE shown in FIG. 4 includes a polarization beam splitter 151 for transmitting a polarized light component such as the P-polarized light component and reflecting the other polarized light component such as the S-polarized light component and a reflection member 152 having a hologram pattern 152a for diffracting the light passed through the polarization beam splitter 151, which is for completely reflecting the incident light. Also, a transparent member 153 for generating a difference in optical axes of respective beams which are reflected from and transmitted through the polarization beam splitter 151 is included between the polarization beam splitter 151 and the reflection member 152. The polarization beam splitter 151 has a structure in which a plurality of thin layers are stacked to transmit one polarized light component. Only the S-polarized light component among the P- and S-polarized light components incident on the HOE 150 is completely reflected by the polarization beam splitter 151 and only the P-polarized light component is transmitted through the polarization beam splitter 151. The light passed through the polarization beam splitter 151 is completely reflected by the reflection member 152 and back to the polarization beam splitter 151 to be transmitted. Of course, the polarization beam splitter 151 can completely reflect the P-polarized light component and transmit the S-polarized light component. Thus, as the P- and S-polarized light components which are incident with the same phase are reflected by the HOE 150, the phases thereof are changed into phases that are different from each other. That is, the light is divided into a light reflected by the polarization beam splitter 151 and a light reflected by the reflection member 152, and the light reflected by the reflection member 152 is diffractively reflected by the hologram pattern 152a. As described previously, the reflective type HOE 150 is arranged at an angle, so that the light entering back into the HOE 150 after being reflected by the recording medium 10, which entered into the recording medium 10 after being emitted from the light source 120, is diffractively reflected. Accordingly, the photodetector 180 receives an information signal, a focusing error signal and a tracking error signal with respect to the recording medium 10 through the above diffraction.

Figure 5:
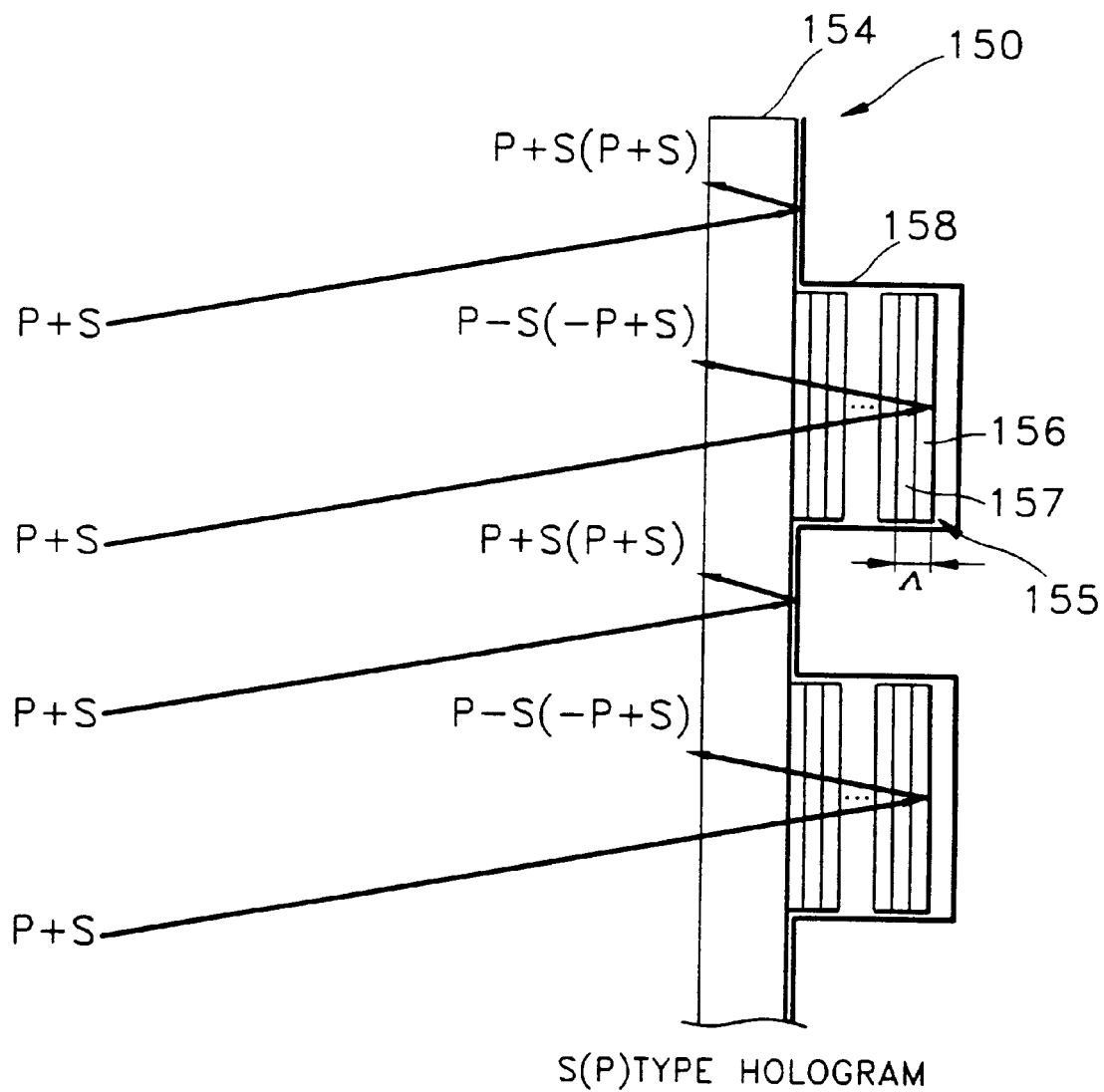
FIG. 5 is a schematic diagram showing another example of the HOE shown in FIG. 3.

Another example of the HOE 150 will be described now with reference to FIG. 5. As shown in FIG. 5, the HOE 150 includes a transparent substrate 154, multiple thin layers 155 stacked on parts of the transparent substrate 154, and a reflection layer 158 coated over the transparent substrate 154 and the multiple thin layers 155. The reflection layer 158 is formed by a metal coating or a reflection coating.

The transparent substrate 154 directly transmits incident light. Thus, the P- and S-polarized light components toward the transparent substrate 154 are transmitted without a phase delay. The multiple thin layers 155 are formed by alternately stacking a first thin layer 156 having a reflective index of $n_L$ and a second thin layer 157 having a reflective index of $n_h$. The multiple thin layers 155 are obtained by forming a multi-layered structure by alternately coating the first and second thin layers 156 and 157 on the transparent substrate 154 and then partially etching the multi-layered structure. The reflective index $n_L$ of the first thin layer 156 and the reflective index $n_h$ of the second thin layer 157 are different from each other.

As described above, the multiple thin layers 155 completely transmit the incident light and delay the phase of the S- or P-polarized light component by 180°. To completely transmit the incident light, the optical depth ($\Lambda$) of a pair of first and second thin layers 156 and 157 which are alternately stacked to form the multiple thin layers 155 should not be a multiple of $\lambda/4$ in which $\lambda$ is a wavelength of the light emitted from the light source 120.

The reflection layer 158 is formed on the transparent substrate 154 and the surface of the multiple thin layers 155 by a total reflection coating, thereby completely reflecting the incident light.

Here, the multiple thin layers 155 delay the P- or S-polarized light component of the incident light by 90°. Thus, the phase of P- or S-polarized light component reflected by the reflection layer 158 after being incident on the multiple thin layers 155 is delayed by 180° with respect to the incident light. Thus, the HOE 150 shown in FIG. 5 performs the same function as the HOE shown in FIG. 4.

Figure 6:
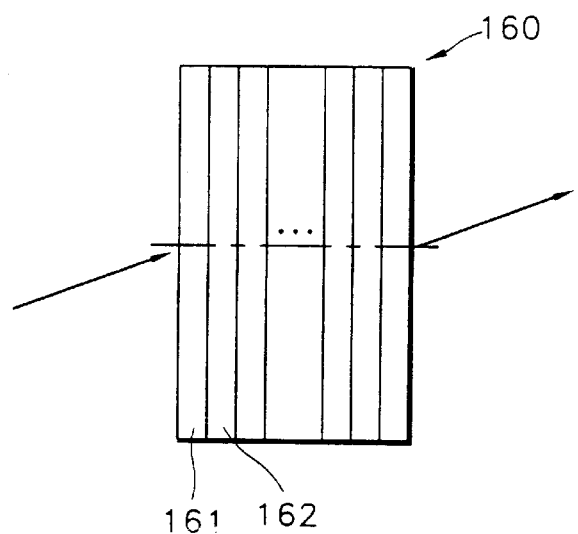
FIG. 6 is a schematic diagram showing an example of the phase delay plate shown in FIG. 3.

The phase delay plate 160 arranged along the optical path between the HOE 150 and the objective lens 170 delays the phase of the light to change a linearly polarized light into a circularly polarized light and a circularly polarized light into a linearly polarized light. To achieve this object, the phase delay plate 160 is formed by alternately stacking a first coating layer 161 and a second coating layer 162 which have different reflective indices, as shown in FIG. 6. The phase delay plate 160 can control the phase difference by controlling the number of respective stacked layers of two coating layers 161 and 162. Here, preferably, the phase delay plate 160 delays the incident light by as much as ¼ the wavelength of the light emitted from the light source 120, that is, by 90°.

Figure 7:
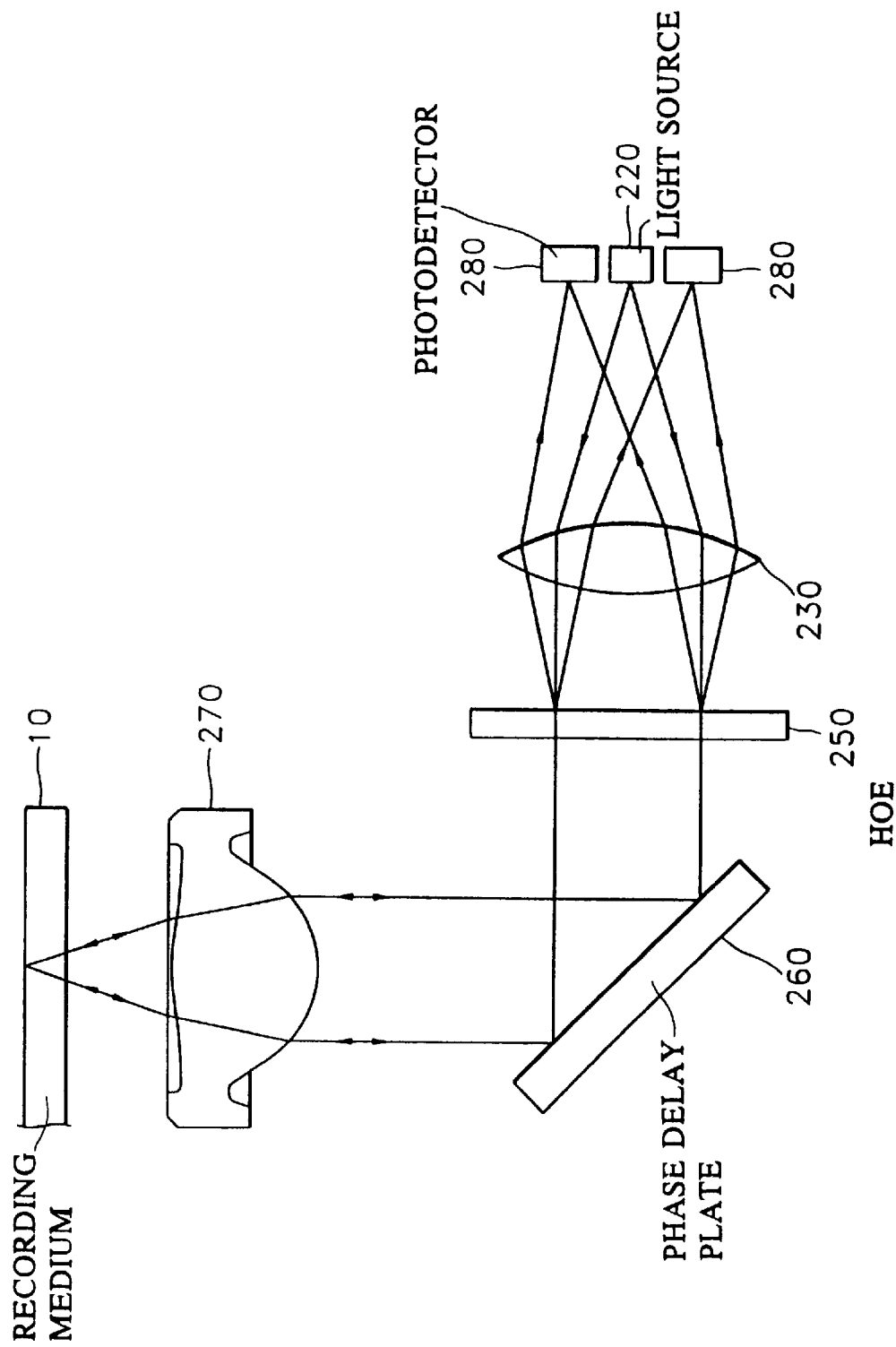
FIG. 7 is a schematic diagram showing the optical arrangement of an optical pickup according to a second embodiment of the present invention.

An optical pickup according to a second embodiment of the present invention will be described with reference to FIG. 7. As shown in FIG. 7, the optical pickup includes a light source 220, an HOE 250, a phase delay plate 260, an objective lens 270, and a photodetector 280 next to the light source 220. The light source 220, the objective lens 270 and the photodetector 280 are the same as the light source 20, the objective lens 70 and the photodetector 80 described with reference to FIG. 1, respectively, and thus a detailed description thereof will be omitted. Also, preferably, a collimating lens 230 for collimating the divergent light emitted from the light source 220 is further included along the optical path between the light source 220 and the HOE 250.

Figure 8:
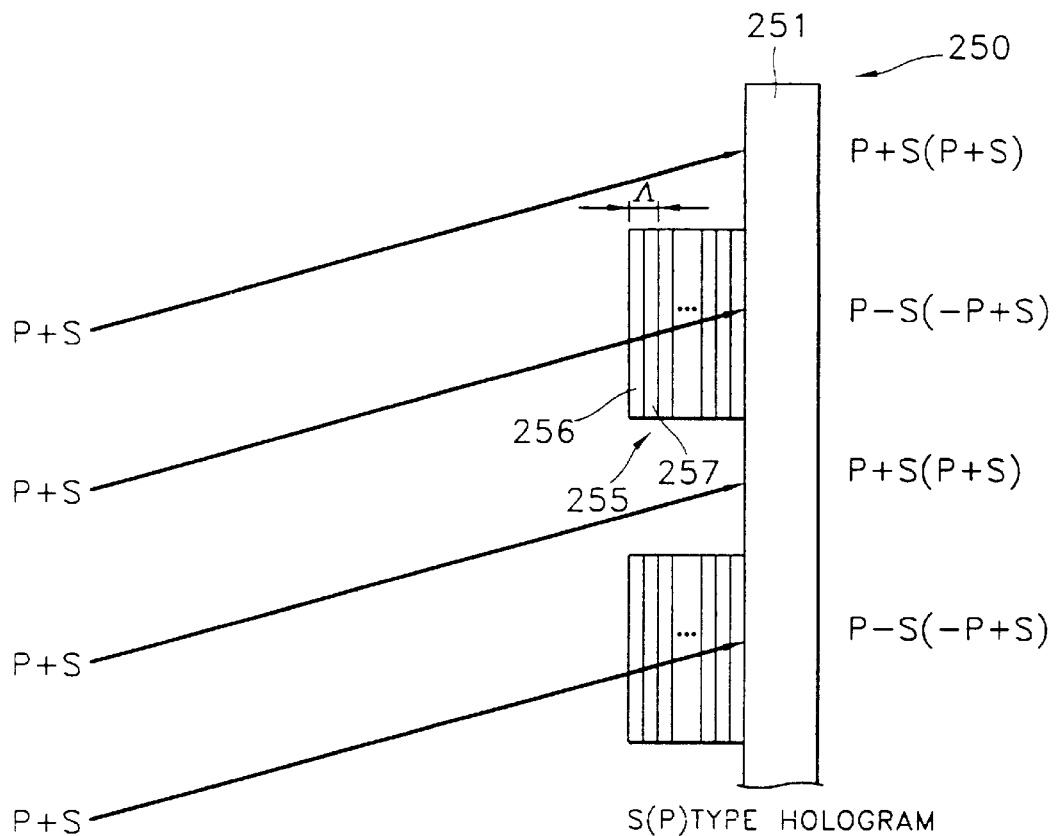
FIG. 8 is a schematic diagram showing an example of the HOE shown in FIG. 7.

As shown in FIG. 8, the HOE 250 includes a transparent substrate 251 and multiple thin layers 255 formed on portions of the transparent substrate 251 by a multi-coating. The transparent substrate 251 directly transmits incident light. Thus, one of the P- and S-polarized light components directed toward the transparent substrate 251 is transmitted without a phase delay. The multiple thin layers 255 have a multi-layered structure which is formed by alternately stacking a first thin layer 256 having a reflective index of $n_l$ and a second thin layer 256 having a reflective index of $n_h$ on the transparent substrate 251 and then partially etching the stacked layer. The reflective index $n_l$ of the first thin layer 256 and the reflective index $n_h$ of the second thin layer 257 are different from each other. The multiple thin layers 255 having the multi-layered structure completely transmit the incident light and delay the phase of the other one of the S- and P-polarized light components of the incident light by 180°.

Here, the HOE 250 for reversing the phase of the S-polarized light component is defined as an S-type HOE while the HOE 250 for reversing the phase of the P-polarized light component is defined as a P-type HOE. When adopting the S-type HOE, the multiple thin layers 255 directly transmit the P-polarized light component without a phase delay and reversely transmits (phase delays) the S-polarized light component by 180°. Thus, compared with a light incident on a portion of the transparent substrate 251 where the multiple thin layers 255 are not formed, the HOE functions with respect to the S-polarized light component. On the contrary, when adopting the P-type HOE, the multiple thin layers 255 directly transmit the S-polarized light component without a phase delay and reversely transmit the P-polarized light component by 180°. Thus, compared with a light incident on the portion of the transparent substrate 251 where the multiple thin layers 255 are not formed, the HOE functions with respect to the P-polarized light component.

Figure 9:
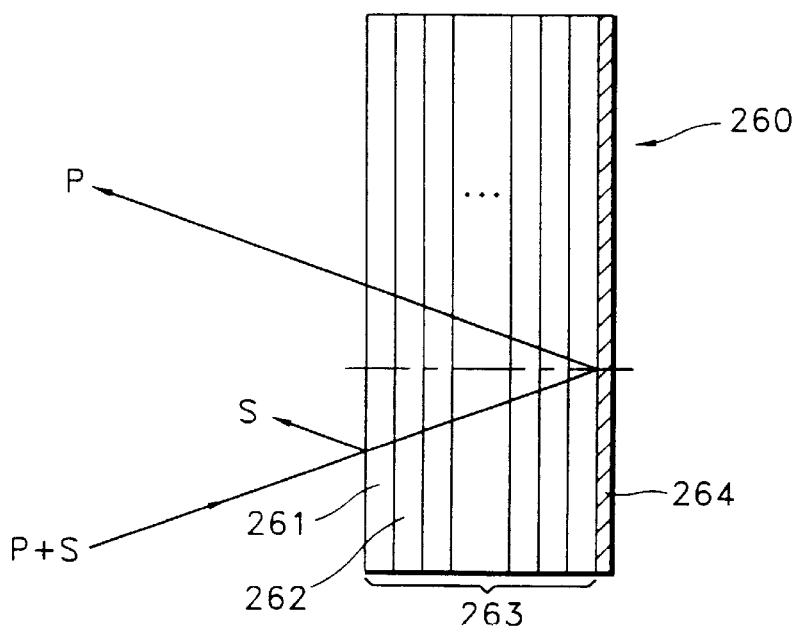
FIG. 9 is a schematic diagram showing an example of the phase delay plate shown in FIG. 7.

The phase delay plate 260 is arranged at an angle at a position along the optical path between the HOE 250 and the objective lens 270 and changes an incident circularly polarized light into a linearly polarized light and an incident linearly polarized light into a circularly polarized light. As shown in FIG. 9, the phase delay plate 260 includes multiple coating layers 263 having a first coating layer 261 and a second coating layer 262 which are alternately stacked with different reflective indices, and a reflection layer 264 coated on one side of the multiple coating layers 263. In the phase delay plate 260 having the above structure, the light is completely reflected by the reflection layer 264, so that a phase difference exists between the incident light and the light passed through the multiple coating layers 263 by 45°.

Here, one polarized light component incident from the light source 220 is reflected by the multiple coating layers 263, and the other polarized light component is transmitted through the multiple coating layers 263 and then reflected by the reflection layer 264. For example, the S-polarized light component among the P- and S-polarized light components having the same phase is reflected by the multiple coating layers 263, and the P-polarized light component is transmitted through the multiple coating layers 263 and then completely reflected by the reflection layer 264. Thus, the phases of the P- and S-polarized light components reflected by the phase delay plate 260 become different from each other. Here, a phase delay of 90° exists between the P- and S-polarized light components in order to change an incident linearly polarized light component into a circularly polarized light component and an incident circularly polarized light component into a linearly polarized light component.

Figure 10:
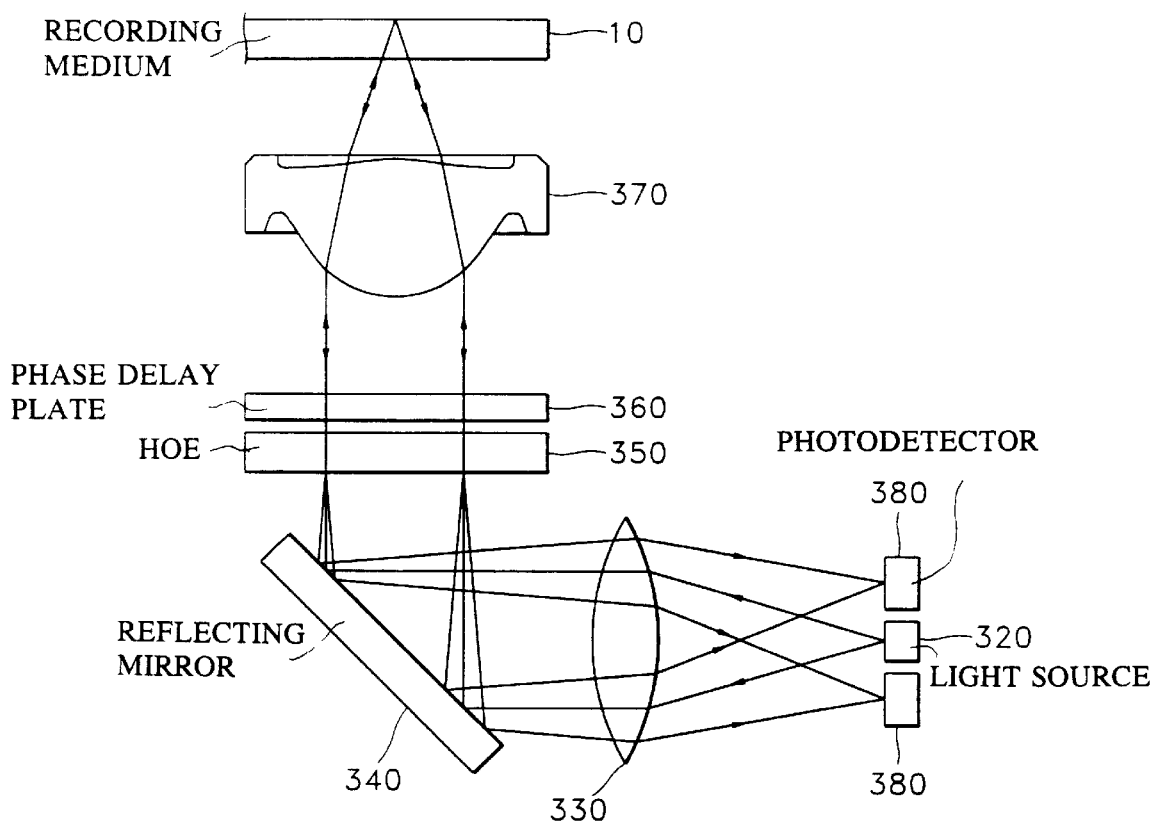
FIG. 10 is a schematic diagram showing the optical arrangement of an optical pickup according to a third embodiment of the present invention.

An optical pickup according to a third embodiment of the present invention will be described with reference to FIG. 10. As shown in FIG. 10, the optical pickup includes a light source 320, a reflecting mirror 340, an HOE 350, a phase delay plate 360, an objective lens 370 and a photodetector 380 arranged next to the light source 320. The light source 320 and the reflecting mirror 340, the objective lens 370 and the photodetector 380 are the same as the light source 20, the reflecting mirror 40 and the objective lens 70 and the photodetector 80 described with reference to FIG. 1, respectively, and thus a detailed description thereof will be omitted. Preferably, a collimating lens 330 for collimating the divergent light emitted from the light source 320 is arranged at a position along the optical path between the light source 320 and the HOE 350.

The HOE 350 includes the transparent substrate 251 and multiple thin layers 255 formed on part of the transparent substrate 251 by a multiple coating, as shown in FIG. 8. The HOE 350 diffractively transmits the light incident from the recording medium 10. The phase delay plate 360 is formed by alternately stacking a first coating layer 161 and a second coating layer 162 each having different reflective indices as shown in FIG. 6, which can control the phase difference by controlling the number of respective stacked layers of two coating layers 161 and 162. The phase delay plate 360 transmits the incident light by delaying the light emitted from the light source 120, by as much as ¼ the wavelength of the light, that is, 90°.

As described above, the optical pickup according to the present invention adopts a low-priced HOE and phase delay plate which have a multi-layered structure instead of a high-priced substrate made of $LiNb_3$, thereby reducing the manufacturing cost. Also, the function of a reflecting mirror located along the optical path between the light source and the HOE can be replaced by the reflective type HOE or the phase delay plate, thereby providing a small optical pickup having a simple optical structure.

What is claimed is:

1. An optical pickup comprising:

a light source;

an objective lens to converge incident light emitted from said light source on a recording medium;

a holographic optical element (HOE) arranged along an optical path between said light source and said objective lens, to change a traveling direction of the incident light, said HOE including
   a polarization beam splitter to pass a first polarized light component of the incident light and to reflect a second polarized light component thereof, and
   a reflection member having a hologram pattern to diffract the first polarized light component passed through said polarization beam splitter, thereby reflecting the first polarized light component;

a phase delay plate arranged between said HOE and the recording medium along the optical path, to change a polarization direction of the incident light; and a photodetector to receive the incident light which is reflected by the recording medium.

2. An optical pickup as claimed in claim 1, wherein said HOE further comprises a transparent member arranged along the optical path and between said polarization beam splitter and said reflection member, to generate different optical axes for the second polarized light component reflected by said polarization beam splitter and first polarized light component passed through said polarization beam splitter.

3. An optical pickup as claimed in claim 2, wherein said polarization beam splitter includes multiple thin layers formed by stacking a plurality of thin layers to transmit the first polarized light component.

4. An optical pickup as claimed in claim 1, wherein the second polarized light component reflected by said polarization beam splitter and the first light component reflected by said reflection member have a phase difference of 90°.

5. An optical pickup as claimed in claim 1, wherein said phase delay plate includes first and second coating layers alternately stacked, said first coating layers having different reflective indices from said second coating layers, to delay the phase of the incident light by 90°.

6. An optical pickup as claimed in claim 1, further comprising a collimating lens arranged along the optical path between said light source and said HOE, to collimate the incident light emitted from said light source traveling in divergent directions.

7. An optical pickup comprising:
   a light source;
   an objective lens to converge incident light emitted from said light source on a recording medium;
   a holographic optical element (HOE) arranged along an optical path between said light source and said objective lens, to change a traveling direction of the incident light, wherein said HOE includes
      a transparent substrate to transmit the incident light,
      multiple thin layers formed by alternately stacking a first thin layer and a second thin layer each having different reflective indices on said transparent substrate to delay a phase of a first component of the incident light relative to a second component of the incident light, and
      a reflection layer coated on said transparent substrate and one side of said multiple thin layers, to completely reflect the first component of the incident light back through said multiple thin layers;
   a phase delay plate arranged between said HOE and the recording medium along the optical path, to change a polarization direction of the incident light; and
   a photodetector to receive the incident light which is reflected by the recording medium via said HOE.

8. An optical pickup as claimed in claim 7, wherein the first light component is one of a P-polarized light component and an S-polarized light component of the incident light, and the second light component is the other one of the P-polarized light component and the S-polarized light component of the incident light, such that the P-polarized light component and the S-polarized light component have a phase difference of 90° relative to each other.

9. An optical pickup as claimed in claim 7, wherein said phase delay plate is formed by alternately stacking a first coating layer and a second coating layer such that said first and second coating layers have different reflective indices to delay the phase of the incident light such that incident P- and S-polarized light components of the incident light entering the phase delay plate have a phase difference of 90° relative to the respective P- and S-polarized light components leaving said phase delay plate.

10. An optical pickup as claimed in claim 7, further comprising a collimating lens arranged along the optical path between said light source and said HOE, to collimate the incident light emitted from said light source traveling in divergent directions.

11. An optical pickup comprising:
   a light source;
   an objective lens to converge light emitted from said light source on a recording medium;
   a holographic optical element (HOE) arranged at a position along an optical path between said light source and said objective lens, to change a traveling direction of the incident light, wherein said HOE includes
      a transparent substrate to transmit the incident light, and
      multiple thin layers formed by alternately stacking a first thin layer and a second thin layer each having different reflective indices on said transparent substrate, to delay a phase of a first component of the incident light relative to a second component of the incident light;
   a phase delay plate arranged between said HOE and the recording medium along the optical path, to change a polarization direction of the incident light; and
   a photodetector to receive the incident light reflected by the recording medium via said HOE.

12. An optical pickup as claimed in claim 11, wherein the first light component is one of a P-polarized light component and an S-polarized light component of the incident light, and the second light component is the other one of the P-polarized light component and the S-polarized light component of the incident light, such that the P-polarized light component and the S-polarized light component have a phase difference of 180° relative to each other.

13. An optical pickup as claimed in claim 11, wherein said phase delay plate is formed by alternately stacking a first coating layer and a second coating layer such that said first and second coating layers have different reflective indices to delay the phase of the incident light such that incident P- and S-polarized light components of the incident light entering the phase delay plate have a phase difference of 90° relative to the respective P- and S-polarized light components leaving said phase delay plate.

14. An optical pickup as claimed in claim 13, further comprising a mirror arranged along the optical path between said light source and said HOE, to change a traveling path of the incident light.

15. An optical pickup as claimed in claim 11, wherein said phase delay plate comprises:
   multiple coating layers having a first coating layer and a second coating layer which are stacked in sequence each having different reflective indices, to transmit one of the first and second polarized light components of the incident light and to reflect the other one of the first and second polarized light components of the incident light; and
   a reflection layer formed on one side of said multiple coating layers, to completely reflect the incident light, so as to delay the other one of the first and second polarized light components to have a phase difference of 90°.

16. An optical pickup as claimed in claim 15, wherein the one of the first and second polarized light components transmitted through said multiple coating layers is one of P- and S-polarized light components and the other one of the first and second polarized light components completely reflected by said reflection layer is the other one of said P- and S-polarized light components.

17. An optical pickup as claimed in claim 11, further comprising a collimating lens arranged between said light source and said HOE, to collimate the incident light emitted from said light source traveling in divergent directions.

* * * * *